March 25, 1941.                B. DI CURZIO                2,236,054
                                  WHEEL
                             Filed May 13, 1940           2 Sheets-Sheet 1
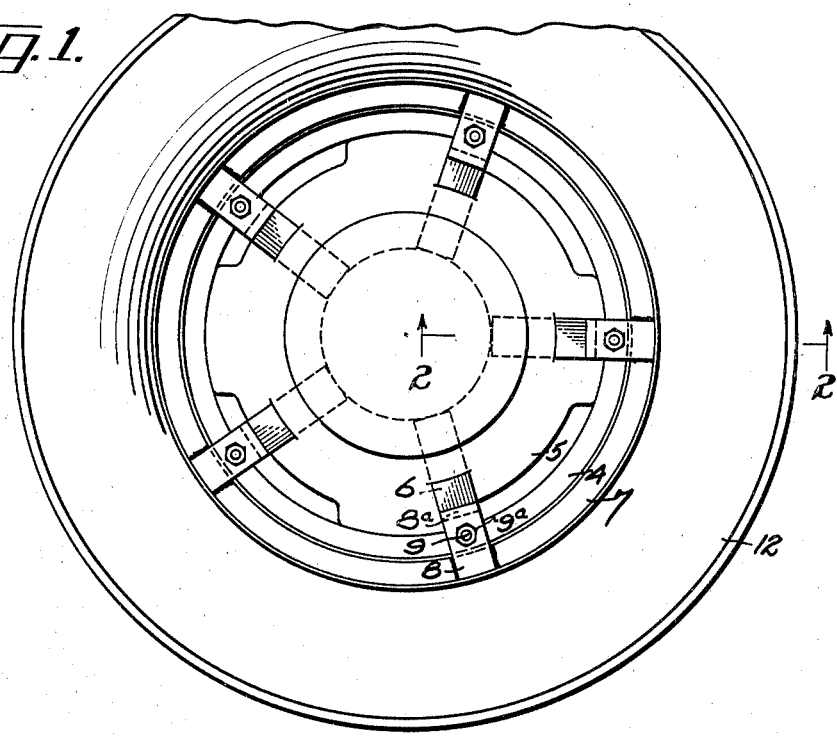
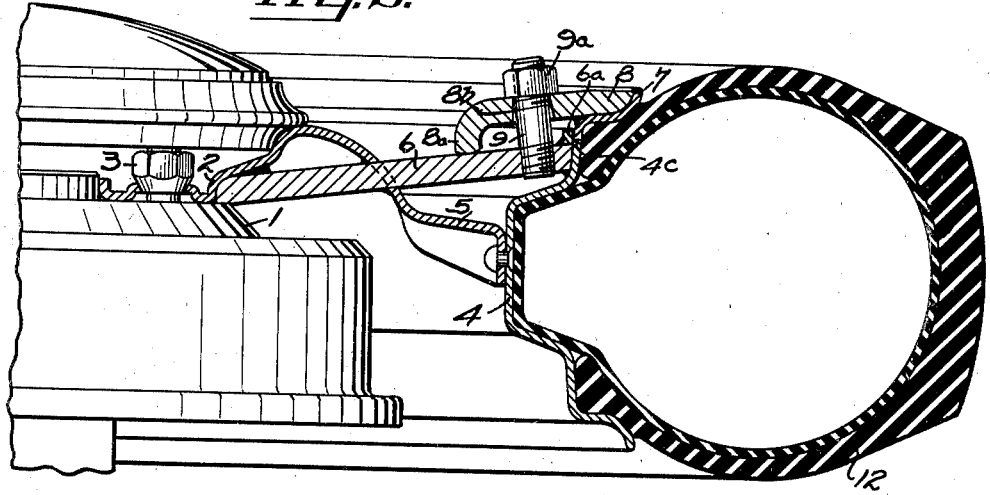
INVENTOR.
Bernardino DiCurzio
BY
ATTORNEY.

March 25, 1941.　　　B. DI CURZIO　　　2,236,054
WHEEL
Filed May 13, 1940　　　2 Sheets-Sheet 2

INVENTOR.
Bernardino DiCurzio
BY
ATTORNEY.

Patented Mar. 25, 1941

2,236,054

UNITED STATES PATENT OFFICE 2,236,054

WHEEL

Bernardino Di Curzio, Detroit, Mich.

Application May 13, 1940, Serial No. 334,700

3 Claims. (Cl. 301—63)

This invention relates to improvements in wheels. It is an object of the invention to provide a wheel wherein the hub is permanently secured to a main portion of a rim throughout the entire circumference of the latter, and a detachable ring provided on one side of the main rim portion which retains the tire in position and which can be quickly and easily secured in place or removed to facilitate tire changing.

Another object of the invention is to provide such a wheel including radial braces extending from the hub to the main rim portion, corresponding inwardly directed radial lugs integral with the ring, and readily removable fastening means for holding each lug relative to one of the braces.

A further object of the invention is to provide such a wheel wherein means are provided for centering the ring on the main rim portion, and to so arrange the lugs and braces that each pair may be securely fastened to one another by a single fastening means. Moreover these fastening means preferably consist, in part, of studs extending from the braces so that they are rigidly held to facilitate the placing of the ring back in position against the main rim portion.

Having thus briefly stated some of the objects and advantages of the invention I will now proceed to describe two preferred embodiments thereof with the aid of the accompanying drawings, in which:

Figure 1 illustrates a side elevation of a wheel of the disc type made according to my invention, and Figure 2 is an enlarged section on the line 2—2 of Figure 1.

Figure 3:
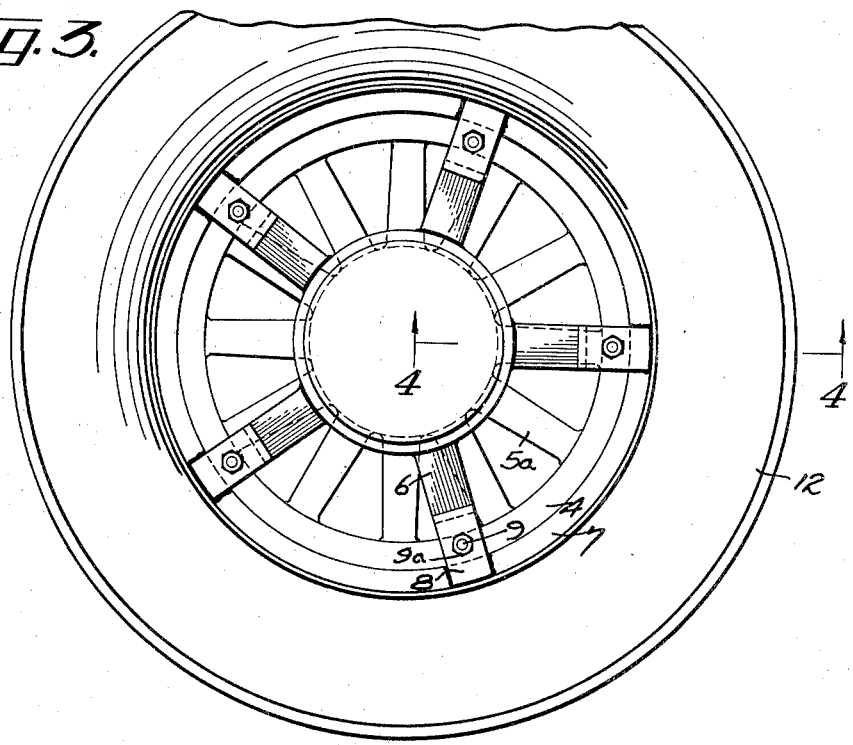
Figure 3 is a side elevation of a spoked type wheel made according to the invention.
Figure 4:
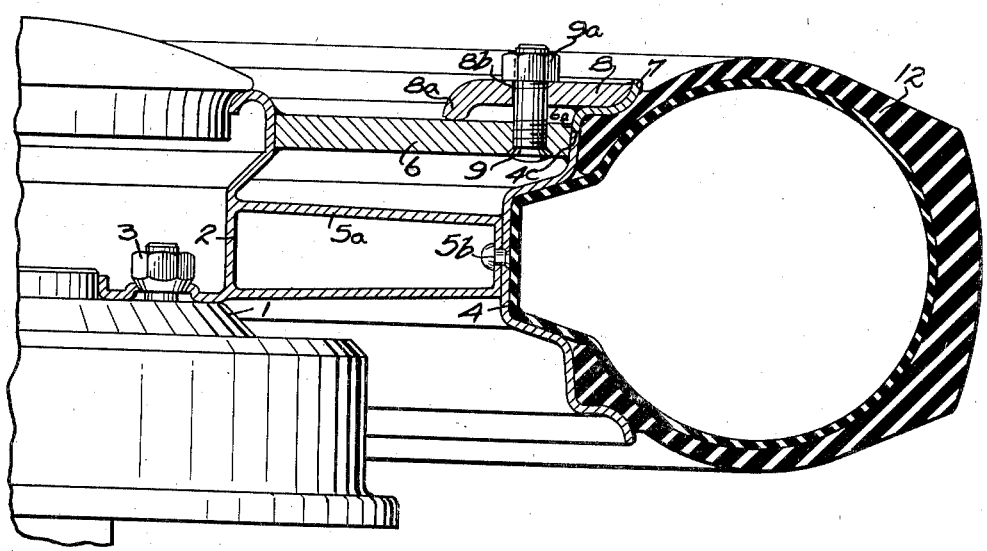
Figure 4 is an enlarged section on the line 4—4 of Figure 3.

Referring to the drawings, I designates an axle flange to which a wheel hub 2 is secured by suitable fastening means 3. In the arrangement shown in Figures 1 and 2 the hub 2 is connected to the main circular rim portion 4 by a disc 5 integral with the said hub, whereas in the spoked wheel shown in Figures 3 and 4, spokes 5a extending radially from the hub 2 are secured to the main circular rim portion 4 by suitable fastening means such as the rivets 5a.

Extending from the hub 2 to the main rim portion 4 are radial braces 6 welded at their opposite extremities to the said hub and main rim portion respectively. The outer extremities 6a of the braces 6 project beyond the adjacent lateral annular margin 4c of the main rim portion 4 to provide centering means for a removable ring 7 which rests against the said annular margin 4c and forms the outer portion on one side of the rim.

Welded to the ring 7 and projecting radially inward therefrom are lugs 8 spaced to correspond to the braces 6. The inner extremities of these lugs are inwardly flexed at 8a to bear against the braces 6. Projecting from each brace 6 is a stud 9 which passes through a suitable opening 8b formed through one of the lugs 8 and has a nut 9a in threaded engagement with its outer extremity. When the nuts 9a are tightened the inwardly flexed lug extremities 8a are forced into engagement with the braces 6 intermediately of their length and the annular margin 4c of the rim portion 4 is brought into engagement with the adjacent annular face of the ring 7 around its entire circumference. The annular faces of the tire 12 are supported between the ring 7 and the opposed annular portion of the main ring portion 4.

It will thus be seen that I have devised a very simple and effective form of wheel wherein the main rim portion is reinforced by the welded radial braces 6; the ring 7 is centered upon the main rim portion 4 by the brace extremities 6a; and the ring is held angularly relative to the main rim portion by the annular contact of the rim face 4c against the adjacent annular face of the ring 7, and a second spacing contact is formed by the inner extremities 8a of the lugs 8 which bear against the braces 6. Consequently the ring must, so long as the nuts are tight, remain correctly positioned relative to the main rim portion, and by removing a single nut from each lug the ring is released from the main rim portion.

While in the foregoing the preferred embodiments of the invention have been described and shown, it is understood that the invention is susceptible to such alterations and modifications as fall within the scope of the appended claims.

What I claim is:

1. A wheel comprising a hub having a circular main rim portion supported concentrically around it, radial braces secured at their opposite extremities to said hub and said main rim portion respectively, a ring resting against one side of the main rim portion adapted to engage one side of a tire mounted on said main rim portion, inwardly projecting radial lugs secured to the ring, and fastening means holding the braces and lugs relative to one another with the adjacent annular edges of the main rim portion and the ring in contact with one another.

2. A wheel comprising the combination set forth in claim 1, wherein the outer extremities of the braces are provided with projections which center the ring relative to the main rim portion.

3. A wheel comprising a hub having a circular main rim portion supported concentrically around it, a ring adapted to engage one side of a tire mounted on the main rim portion, said main rim portion and said ring having contacting annular edges, braces extending radially from the hub to the main rim portion and welded at their opposite extremities to said hub and main rim portion respectively, the outer extremities of the braces having projections thereon centering the ring relative to the main rim portion, inwardly projecting radial lugs welded to the ring one opposite each brace, said lugs having inturned inner extremities bearing against said braces intermediately of the length of the latter, a stud carried by each brace extending through an aperture formed in the lug opposite to it, and nuts on the studs holding the inner lug extremities in contact with their braces with the coacting annular edges of the main rim portion and the ring in engagement.

BERNARDINO DI CURZIO.